(12) United States Patent
Matilainen et al.

(10) Patent No.: US 6,245,882 B1
(45) Date of Patent: Jun. 12, 2001

(54) METHOD FOR THE PREPARATION OF POLYMERS

(75) Inventors: Leena Matilainen, Kauniainen (FI); Guomin Bian, Toronto (CA); Claude Ostiguy, Blainville (CA); Rick Cheng, Mississauga (CA); Matti Satuli, Hamina; Kari Leskinen, Porvoo, both of (FI); Kwok Tang, Mississauga (CA)

(73) Assignee: Neste Chemicals Oy, Porvoo (FI)

( * ) Notice: Subject to any disclaimer, the term of this patent is extended or adjusted under 35 U.S.C. 154(b) by 0 days.

(21) Appl. No.: 09/388,383

(22) Filed: Sep. 1, 1999

(30) Foreign Application Priority Data

Mar. 26, 1999 (FI) .......................................... 990674

(51) Int. Cl.$^7$ .................. C08F 6/14; C08G 8/10
(52) U.S. Cl. ................ 528/489; 528/129; 528/140; 528/145; 528/147; 528/486; 528/488; 528/499; 528/503; 524/801; 524/841; 524/842; 524/843; 524/844
(58) Field of Search .................... 528/489, 129, 528/140, 145, 147, 486, 488, 499, 503; 524/801, 841, 842, 843, 844

(56) References Cited

U.S. PATENT DOCUMENTS

| 4,026,848 | 5/1977 | Harding et al. . |
| 4,098,770 | 7/1978 | Berchem et al. . |
| 4,131,582 | 12/1978 | Kako et al. . |
| 4,303,758 | * 12/1981 | Gusmer ................................. 528/121 |
| 4,904,516 | 2/1990 | Creamer . |
| 5,371,140 | 12/1994 | Parks . |

FOREIGN PATENT DOCUMENTS

| 466557 | 1/1969 | (CH) . |
| 64614 | 12/1983 | (FI) . |
| 763774 | 12/1983 | (FI) . |
| 961331 | 7/1997 | (FI) . |
| 1527451 | 10/1978 | (GB) . |
| 2224509A | 5/1990 | (GB) . |
| 53-049095 | 5/1978 | (JP) . |
| 57-034114 | 2/1982 | (JP) . |
| 7268181 | 10/1995 | (JP) . |
| 11060664 | 3/1999 | (JP) . |
| 398884 | 1/1978 | (SE) . |
| 417103 | 2/1981 | (SE) . |

OTHER PUBLICATIONS

JP 07–018159A Abstract (Jan. 2, 1995) STN International Caplus 1995:475862.
JP 07–018159A2 Abstract (Jan. 20, 1995) WPI Derwent 1995–093985.
JP 728181A Abstract (Oct. 17, 1995) WPI Derwent 1995–390422.
JP 53049095A Abstract (May 4, 1978) WPI Derwent 1978–42881A.
JP 5703411A Abstract (Feb. 24, 1982) WPI Derwent 1982–27068E.
JP 11060664A Abstract (Mar. 2, 1999) STN International Caplus 1999:142436.
JP 11060664A2 Anbstract (Mar. 2, 1999) WPI Derwent 1999–232624.

* cited by examiner

*Primary Examiner*—Duc Truong
(74) *Attorney, Agent, or Firm*—Birch, Stewart, Kolasch & Birch, LLP

(57) ABSTRACT

Method for the manufacture of a phenolic resin emulsion and/or dispersion, wherein an aldehyde, a phenolic compound and an alkaline catalyst are allowed to react at a temperature of 40–100° C. until a desired degree of condensation is achieved, and the pH of the resin is adjusted to a value below 9 using an acid in the presence of a surface active agent or a mixture thereof at a temperature below 100° C. and a phenolic resin emulsion and/or dispersion is obtained providing a colorless or light-colored glue line or surface when cured.

25 Claims, No Drawings

METHOD FOR THE PREPARATION OF POLYMERS

BACKGROUND OF THE INVENTION

The present invention relates to phenolic resin emulsions and/or dispersions. In particular this invention relates to stable phenolic resin emulsions and/or dispersions which form a colourless or light-coloured glue line or surface when cured.

DESCRIPTION OF THE RELATED ART

Phenolic resins are broadly used and commercially important materials, which are applied in a wide range of products. Examples of such products include coatings, binders for inorganic materials or for organic materials, laminates, mouldings, castings and adhesives. However, conventional resins have shown several problems relating to storage stability and quality. One of the major problems is that resins often tend to be red-brownish of colour and thus they are not suitable for all applications. Conventional resole resins form strongly red-brownish curing products. Several attempts have been made to overcome the problem of the colouring of the resin. A method for the preparation of a resole, which has colourless or light-coloured nature, is disclosed in FI patent application 961331. The object has been achieved by preparing, storing and using the resole in the absence of oxygen, which means under an inert gas atmosphere, such as under nitrogen, in order to avoid the formation of the undesired red-brownish compounds. However, constant inert gas atmosphere is often difficult to achieve.

The reduction of discolouration of a phenol formaldehyde resin composition is mentioned in a method disclosed in GB 2 224 509 wherein an additive such as a reaction product of a hemiformal with urea and formaldehyde is incorporated into the composition. However, this method is cumbersome because of several additional process steps.

SUMMARY OF INVENTION

Based on the above, it can be seen that there clearly exists a need for a simple and efficient method for the manufacture of phenolic systems, which form a colourless or light-coloured glue line or surface when cured, and for such phenolic resin emulsions and/or dispersions. A method according to the present invention for the manufacture of phenolic dispersions includes reacting formaldehyde, phenol, and an alkaline catalyst at a temperature of 40–100° C. until a desired degree of condensation is achieved, adjusting the pH of the resin to a value below 9 using an acid in the presence of a surface active agent or a mixture thereof at a temperature below 100° C., and obtaining a phenolic resin emulsion and/or dispersion which provides a colourless or light-coloured glue line or surface when cured, wherein the surface active agent is, starch, modified starch, cellulose, modified cellulose, a modified or an unmodified acrylic homopolymer or copolymer, a protein derivative or a mixture thereof.

The invention is based on the observation that the red-brownish colour of conventional resole resins is due to formation of oxidized polyphenolic derivatives during the preparation of the resole arising from reaction with atmospheric oxygen. Polyphenolic species similar to these, are commonly used as acid-base indicators which are known to be reddish under alkaline conditions and colourless or yellowish under slightly alkaline to acidic conditions.

DETAILED DESCRIPTION OF INVENTION

In the method according to the invention, the resins are prepared by the condensation of aldehydes (F) and phenolic compounds (P) in a molar ratio of 1.05:1–4:1, preferably 2:1–3:1 (F/P) at elevated temperatures in the presence of a sufficient amount of water to adjust the amount of dry solids in the product to 25–75 wt %, preferably to 35–60 wt %, and in the presence of an alkaline catalyst and surface active agent(s). At a desired step of condensation, the pH of the resin is adjusted to a value below 9, preferably to a value below 8, using an acid. A sufficient amount of a surface active agent is added. If no surface active agent is present, the obtained resin precipitates out of the solution and forms large aggregates, which are not easily water-dispersible or dilutable. An emulsion is formed during the condensation step or during the pH adjustment. The surface active agent can be added at any suitable step during the reaction prior to the pH adjustment.

Alternatively, the process can also be performed as post-emulsification wherein conventional phenolic resins of similarly defined molar ratio can be used as a starting materials. The pH of the phenolic resin is adjusted to a value below 9, preferably to a value below 8 using an acid, in the presence of a surface active agent or a combination of surface active agents. An emulsion is formed during the pH adjustment of the resin. The surface active agent is added prior to the pH adjustment.

The obtained product is a phenolic resin emulsion and/or dispersion, which forms a colourless or light-coloured glue line or surface when cured. The characteristic light-coloured or colourless nature of the cured products of the resin according to the invention is achieved during the manufacturing process, when the pH of the condensation product is adjusted to a value below 9.

The condensation reaction takes place in the presence of an alkaline catalyst, such as an oxide, a hydroxide or a carbonate of an alkali metal or of an alkaline-earth metal, suitably NaOH, KOH, LiOH, $Ca(OH)_2$, $Ba(OH)_2$, MgO or CaO, of an organic base such as a tertiary amine, or of mixtures thereof. A suitable acid for adjusting of the pH is an organic or an inorganic acid, such as p-toluene sulphonic acid, sulphuric acid, acetic acid or formic acid or the like or mixtures thereof A suitable surface active agent, such as a surfactant, a protective colloid or a thickener, is an anionic, a cationic, a non-ionic or an amphoteric surface active agent and suitably it is starch, modified starch, a modified or an unmodified acrylic homopolymer or copolymer, cellulose, modified cellulose, xanthane gum, guargum, arabigum, a protein derivative, sodium caseinate, soy protein and the like or any type of compound giving the system sufficient surface active function for emulsion formation, or a mixture thereof 0.01–10 wt %, preferably 0.5–8.0 wt % of surface active agent is used.

The method according to the invention for the preparation of phenolic resin emulsions and/or dispersions is described in more detail in the following.

An aldehyde compound, preferably formaldehyde, a phenolic compound, preferably phenol, water and a surface active agent, preferably starch or a modified starch, modified or unmodified acrylic homopolymer or copolymer, cellulose, modified cellulose, protein derivative or a mixture thereof or a combination of surface active agents, are charged into a reaction vessel. Anti-foaming agents and other additives known in the art may also be used. Alternatively, the surface active agent can be added at any stage of the reaction prior to the pH adjustment or prior to advanced condensation. The alkaline catalyst, NaOH, KOH, LiOH, $Ca(OH)_2$, $Ba(OH)_2$, MgO, CaO or an organic base, such as a tertiary amine, preferably triethylamine or mixtures thereof is then added and the temperature is raised to 40–100° C., preferably to 60–90° C., and the temperature is maintained at elevated temperature until a desired degree of condensation is achieved. The degree of condensation can be followed by a suitable method, for example by viscosity measurement or by cloud point tests. The obtained condensation product is then optionally cooled down and the cooling may optionally be performed under vacuum. The pH of the resin is adjusted using a suitable acid preferably sulphuric acid, acetic acid, formic acid, p-toluene sulphonic acid, or a mixture thereof at a temperature below 100° C, preferably at 20–70° C. The pH adjustment may be performed during the process and it may also optionally be performed later, in situ before use of the resin on site.

Alternatively, the emulsification may also be performed in situ. A condensation product, liquid phenolic resin is heated to a temperature below 100° C., preferably to 20–70° C., and 0.01–10 wt %, preferably 0.5–8.0 wt % of a surface active agent or a mixture thereof is added. The pH of the resin is adjusted to a value below 9, preferably to a value below 8 using an acid, preferably sulphuric acid, acetic acid, formic acid, p-toluene sulphonic acid or a mixture thereof The adjustment may be performed during the process and it may also optionally be performed in situ before use of the resin.

The phenolic resin emulsion and/or dispersion according to the invention yields a highly desired colourless or light-coloured glue line or surfaces when cured in application areas such as plywood, laminated veneer lumber (LVL), fibre board, composite wood board, such as oriented strand board, particle board, insulation materials, fibre tissues, rubber materials, non-wovens, molding materials, paper impregnation and laminated beam applications and manufacturing.

The major characteristics of the products obtained using the phenolic resin emulsion and/or dispersion according to the invention include a natural-looking finishing without red-brownish glue lines or spots. The method and phenolic resin emulsion and/or dispersion according to the present invention have significant advantages compared with the resins according to prior art because the resin according to the invention will stay colourless or light-coloured under acidic or neutral conditions and it requires no additional handling procedures. The products can be used in any applications in which a colourless or light-coloured formaldehyde based resin is desired.

The invention is illustrated in the following by examples with some preferred embodiments of the invention to which, however, the invention is not limited.

EXAMPLE 1

Preparation of a Phenolic Resin Emulsion

Phenol (P) and formaldehyde (F) in a molar ratio of 2:1–3:1 (F/P) and a sufficient amount of water to adjust the dry solids in the product to 40–55 wt % are charged into a reaction vessel. 0.1–12 wt % of NaOH is carefully added to the reaction mixture. The temperature is raised and maintained below 75° C. 0.1–8 wt % of a modified acrylic copolymer is added and the temperature is raised and maintained below 95° C. during the condensation reaction. The temperature is dropped to 80° C. or less. The condensation reaction is continued until a viscosity of 500–3000 cP is reached. The pH is adjusted using an acid solution. An emulsion is formed during the pH adjustment. The product is cooled.

EXAMPLE 2

Preparation of a Phenolic Resin Emulsion

Phenol and formaldehyde in a molar ratio of 1.5:1–3:1 (F/P), water and 0.01–4 wt % of modified starch are charged into a reaction vessel. 0.1–12 wt % of NaOH is carefully added. The temperature of a reaction mixture is raised and maintained below 100° C. The condensation reaction is then continued until a viscosity of 1000–3000 cP is reached. The pH adjustment is performed using an acid solution. The resin is cooled.

EXAMPLE 3

Preparation of a Phenolic Resin Emulsion Using a Conventional Resin of the Previously Defined Molar Ratio as a Starting Material 500 g of phenolic resin is placed into a reaction vessel and 0.1–8% of modified acrylic copolymer is added under stirring. The pH of the resin is adjusted with acid to a pH value below 8. An emulsion is formed.

EXAMPLE 4

Preparation of a Phenolic Resin Emulsion with the Molar Ratio Range Mentioned Previously Phenol and formaldehyde in a molar ratio of 1.5:1–3.1 (F/P) and a sufficient amount of water to adjust the dry solids in the product to 40–55 wt % are charged into a reaction vessel. 0.1–12 wt % of NaOH is carefully added. The temperature is raised and maintained below 95° C. until the desired condensation degree is reached. 0.1–8 wt % of a modified acrylic copolymer is added at the temperature of 50–80 ° C. The pH of the resin is adjusted with acid to a value below 8. An emulsion is formed.

EXAMPLE 5

Preparation of a Phenolic Resin Emulsion

Phenol (P) and formaldehyde (F) in a molar ratio of 1.5:1–3:1 (F/P), water and 0.1–7 wt % of modified starch are charged into a reactor vessel. 0.1–12wt % of NaOH is carefully added. The temperature of a reaction mixture is raised and maintained below 100° C. until the desired condensation degree is reached. The temperature is dropped to 80° C. or less. The pH is adjusted using an acid solution to a pH value below 8. An emulsion is formed 0.05–1 wt % of modified cellulose and 0.2–2 wt % of protein derivative are added slowly.

What is claimed is:

1. Method for the manufacturing of a stable phenolic resin emulsion and/or dispersion, which comprises reacting formaldehyde, phenol, and an alkaline catalyst at a temperature of 40–100° C. until a desired degree of condensation is achieved, adjusting the pH of the resin to a value below 9 using an acid in the presence of a surface active agent or a mixture thereof at a temperature below 100° C., and obtaining a phenolic resin emulsion and/or dispersion which provides a colourless or light-coloured glue line or surface when cured, wherein the surface active agent is starch, modified starch, cellulose, modified cellulose, a modified or an unmodified acrylic homopolymer or copolymer, a protein derivative or a mixture thereof.

2. Method according to claim 1, wherein the molar ratio of formaldehyde (F) and the phenol (P) F:P is 1.05:1–4:1, and the reaction is performed in the presence of a sufficient amount of water to adjust the amount of dry solids in the product to 25–75 wt %.

3. Method according to claim 1, wherein the alkaline catalyst is an oxide, a hydroxide or a carbonate of an alkali metal or an alkaline-earth metal, an organic base or a mixture thereof.

4. Method according to claim 1, wherein the alkaline catalyst is NaOH, KOH, LiOH, Ca(OH)$_2$, Ba(OH)$_2$, MgO, CaO or a tertiary amine or a mixture thereof.

5. Method according to claim 1, wherein the amount of the alkaline catalyst is 0.1–12 wt %.

6. Method according to claim 1, wherein additives are used.

7. Method according to claim 1, wherein the acid is an organic or an inorganic acid or a mixture thereof.

8. Method according to claim 1, wherein the acid is sulphuric acid, p-toluene sulphonic acid, acetic acid or formic acid or a mixture thereof.

9. Method according to claim 1, wherein the amount of the surface agent is 0.01–10 wt %.

10. Method according to claim 1, wherein the pH adjustment using an acid is performed during the process or in situ before the use of the resin.

11. Phenolic resin emulsion and/or dispersion which is manufactured according to claim 1.

12. Composition comprising phenolic resin emulsion and/or dispersion according to claim 11, and plywood, composite wood board, fibre board, non-wovens, laminated beam preparations, paper, laminated veneer lumber, insulation materials, fibre tissues, oriented strand boards, rubber materials or moulding materials.

13. Method according to claim 1, characterized in that the surface active agent comprises a combination of modified starch, modified cellulose and a protein derivative.

14. Method according to claim 2 wherein the molar ratio of F:P is 2:1–3:1, and the amount of dry solids in the product is 35–60 wt %.

15. Method according to claim 4, wherein the tertiary amine is triethylamine.

16. Method according to claim 6, wherein anti-foaming agents are present during the reaction.

17. Method according to claim 9, wherein the amount of the surface active agent is 0.5–8.0 wt %.

18. Method for the manufacture of stable phenolic resin emulsion and/or dispersion which comprises heating a phenolic resin to a temperature below 100° C., adding a surface active agent or mixture thereof, adjusting the pH of the resin to a value below 9 using an acid the surface active agent being starch, modified starch, cellulose, modified cellulose, a modified or an unmodified acrylic homopolymer or a copolymer, a protein derivative or mixture thereof, and providing a colourless or light-coloured glue line or surface when cured.

19. Method according to claim 18, wherein the acid is an organic or an inorganic acid or a mixture thereof.

20. Method according to claim 18, wherein the acid is a sulphuric acid, p-toluene sulphonic acid or formic acid or a mixture thereof.

21. Method according to claim 18, wherein the amount of the surface active agent is 0.01–10 wt %.

22. Method according to claim 18, wherein the pH adjustment using an acid is preformed during the process or in situ before the use of the resin.

23. Stable phenolic resin emulsion and/or dispersion which is manufactured according to claim 18.

24. Composition comprising phenolic resin emulsion and/or dispersion according to claim 23, and plywood, composite wood board, fibre board, non-wovens, laminated beam preparations, paper, laminated veneer lumber, insulation materials, fibre tissues, oriented strand boards, rubber materials or moulding materials.

25. Method according to claim 21, wherein the amount of the surface active agent is 0.5–8.8 wt %.

* * * * *